US011026188B2

(12) United States Patent
Desclos et al.

(10) Patent No.: US 11,026,188 B2
(45) Date of Patent: *Jun. 1, 2021

(54) POWER CONTROL METHOD FOR SYSTEMS WITH ALTITUDE CHANGING OBJECTS

(71) Applicant: Ethertronics, Inc., San Diego, CA (US)

(72) Inventors: Laurent Desclos, San Diego, CA (US); Jeffrey Shamblin, San Diego, CA (US)

(73) Assignee: Ethertronics, Inc., San Diego, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/777,337

(22) Filed: Jan. 30, 2020

(65) Prior Publication Data

US 2020/0169963 A1 May 28, 2020

Related U.S. Application Data

(62) Division of application No. 16/002,377, filed on Jun. 7, 2018, now Pat. No. 10,582,456.

(Continued)

(51) Int. Cl.
*H04W 52/28* (2009.01)
*H04W 52/42* (2009.01)

(52) U.S. Cl.
CPC ......... *H04W 52/283* (2013.01); *H04W 52/42* (2013.01)

(58) Field of Classification Search
CPC ............................ H04W 52/283; H04W 52/42
See application file for complete search history.

(56) References Cited

U.S. PATENT DOCUMENTS 5,566,354 A * 10/1996 Sehloemer ......... H04B 7/18539
455/13.1
6,128,469 A * 10/2000 Zenick, Jr. ............. H01Q 1/288
455/12.1

(Continued)

FOREIGN PATENT DOCUMENTS

GB 2542491 3/2017
JP 0786824 3/1995

(Continued)

OTHER PUBLICATIONS

PCT International Search Report and Written Opinion for corresponding PCT Application No. PCT/US2018/036458, dated Sep. 28, 2018, 16 pages.

(Continued)

*Primary Examiner* — Dominic E Rego
(74) *Attorney, Agent, or Firm* — Dority & Manning, P.A.

(57) ABSTRACT

A communication system for an altitude changing object is provided. The communication system can include an antenna system having one or more antennas. The one or more antennas can be associated with a single fixed radiation pattern. The communication system can include one or more processors configured to execute a control routine to perform operations. The operations can include obtaining data indicative of one or more communication parameters associated with the altitude changing object. The operations can include determining a transmit power for each of the one or more antennas based at least in part on the one or more communication parameters. The operations can include controlling the antenna system based at least in part on the transmit power to communicate with a node in the communication network.

10 Claims, 9 Drawing Sheets

Related U.S. Application Data

(60) Provisional application No. 62/516,651, filed on Jun. 7, 2017.

(56) References Cited

U.S. PATENT DOCUMENTS

| | | | |
|---|---|---|---|
| 6,611,683 B1* | 8/2003 | Castiel | B64G 1/1007 244/150 |
| 6,765,536 B2 | 7/2004 | Phillips et al. | |
| 6,987,493 B2 | 1/2006 | Chen | |
| 7,068,234 B2 | 6/2006 | Sievenpiper | |
| 7,158,073 B2 | 1/2007 | Ybarra | |
| 7,215,289 B2 | 5/2007 | Harano | |
| 7,450,082 B1* | 11/2008 | Lopez | H01Q 7/00 343/850 |
| 7,830,320 B2 | 11/2010 | Shamblin et al. | |
| 7,869,943 B1* | 1/2011 | Simon | G01C 23/005 244/75.1 |
| 7,911,402 B2 | 3/2011 | Rowson et al. | |
| 8,362,962 B2 | 1/2013 | Rowson et al. | |
| 8,446,318 B2 | 5/2013 | Ali et al. | |
| 8,648,755 B2 | 2/2014 | Rowson et al. | |
| 8,717,241 B2 | 5/2014 | Shamblin et al. | |
| 9,065,496 B2 | 6/2015 | Rowson et al. | |
| 9,231,669 B2 | 1/2016 | Desclos et al. | |
| 9,240,634 B2 | 1/2016 | Rowson et al. | |
| 9,425,497 B2 | 8/2016 | Pajona et al. | |
| 9,439,151 B2 | 9/2016 | Zhu et al. | |
| 9,479,242 B2 | 10/2016 | Desclos et al. | |
| 9,479,964 B2 | 10/2016 | Jalali | |
| 9,590,703 B2 | 3/2017 | Desclos et al. | |
| 9,622,133 B1 | 4/2017 | Guvenc | |
| 9,755,305 B2 | 9/2017 | Desclos et al. | |
| 9,755,580 B2 | 9/2017 | Desclos et al. | |
| 2003/0137444 A1* | 7/2003 | Stone | G08G 5/0021 342/30 |
| 2005/0231418 A1 | 10/2005 | Ybarra | |
| 2006/0189309 A1* | 8/2006 | Good | H04W 16/14 455/427 |
| 2008/0298275 A1* | 12/2008 | De Sousa | H04W 16/18 370/255 |
| 2010/0172328 A1* | 7/2010 | McGuffin | H04B 7/18506 370/332 |
| 2010/0311460 A1* | 12/2010 | Hofmann | H04B 7/18506 455/522 |
| 2011/0105059 A1* | 5/2011 | Gaal | H04W 52/30 455/127.1 |
| 2013/0044611 A1* | 2/2013 | Jalali | H04B 7/18502 370/252 |
| 2014/0210636 A1 | 7/2014 | Nam | |
| 2014/0349696 A1* | 11/2014 | Hyde | H04W 24/02 455/517 |
| 2015/0031345 A1* | 1/2015 | Hyde | H01Q 1/241 455/418 |
| 2015/0155623 A1 | 6/2015 | Shamblin et al. | |
| 2016/0088498 A1* | 3/2016 | Sharawi | B64C 39/024 370/241 |
| 2016/0112116 A1 | 4/2016 | Jalali et al. | |
| 2016/0137317 A1* | 5/2016 | Bigras | B64G 1/242 244/158.6 |
| 2016/0227416 A1* | 8/2016 | Suzuki | H04W 16/14 |
| 2016/0328979 A1* | 11/2016 | Postrel | H04W 4/46 |
| 2016/0330771 A1* | 11/2016 | Tan | H04W 72/08 |
| 2016/0357183 A1* | 12/2016 | Shaw | G05D 1/0027 |
| 2017/0004662 A1* | 1/2017 | Gong | G07C 5/004 |
| 2017/0019814 A1* | 1/2017 | Determan | H01Q 3/34 |
| 2017/0105139 A1 | 4/2017 | Jalali | |
| 2017/0133764 A1 | 5/2017 | Tinaphong | |
| 2017/0180929 A1* | 6/2017 | Cavendish | H04W 4/50 |
| 2017/0208489 A1* | 7/2017 | Djordjevic | H04W 24/10 |
| 2017/0223768 A1* | 8/2017 | Jain | H04L 1/1887 |
| 2017/0299703 A1* | 10/2017 | Stokes | G01S 7/52077 |
| 2017/0339516 A1* | 11/2017 | Edge | H04W 48/12 |
| 2018/0026718 A1* | 1/2018 | Leiba | G01S 5/0257 370/310 |
| 2018/0101169 A1* | 4/2018 | Applewhite | G08G 5/0069 |
| 2018/0123692 A1* | 5/2018 | Leiba | H04B 5/0081 |
| 2018/0175503 A1 | 6/2018 | Liu | |
| 2018/0219524 A1* | 8/2018 | Govindaraj | H03H 7/38 |
| 2018/0265194 A1* | 9/2018 | Gauglitz | G06Q 50/28 |
| 2018/0315324 A1* | 11/2018 | Singh | G08G 5/0086 |
| 2018/0321680 A1* | 11/2018 | Tu | G08C 17/02 |
| 2020/0145809 A1* | 5/2020 | Cavendish | H04W 4/90 |
| 2020/0225684 A1* | 7/2020 | Anderson | B64F 3/02 |

FOREIGN PATENT DOCUMENTS

| | | |
|---|---|---|
| KR | 1020160103762 | 9/2016 |
| KR | 1020160103762 | 12/2017 |

OTHER PUBLICATIONS

"Potential enhancements for drones", 3d. Generation Partnership Project, TSG Radio Access Network, Radio Layer 1, Hangzhou, China, May 15-19, 2017, 4 pages.

* cited by examiner

SYSTEM CONTROL MATRIX $S_{m,n,p,t}$ $$\left[ CL(SINR_n, SINR_i, A, O, ABS, F) \right]$$

GENERALIZED SYSTEM CONTROL MATRIX
PARAMETER CL REFERS TO COMMUNICATIONLINK AND
THIS PARAMETER CAN BE ANY METRIC THAT CHARACTERIZES
THE COMMUNICATION LINK

WHERE
$SINR_n$ = SINR OF INTENDED LINK
$SINR_i$ = SINR OF INTEFERERS
A = ALTITUDE OF MODEM
O = ORIENTATION OF MODEM
ABS = ANTENNA BEAM STATE
F = FREQUENCY BAND

FIG. 6

POWER CONTROL METHOD FOR SYSTEMS WITH ALTITUDE CHANGING OBJECTS

PRIORITY CLAIM

The present application is a divisional of U.S. Nonprovisional patent application Ser. No. 16/002,377, titled "Power Control Method For Systems With Altitude Changing Objects," filed Jun. 7, 2018, which claims the benefit of priority of U.S. Provisional Patent Application Ser. No. 62/516,651, titled "Power Control Method for Cellular Systems with Airborne Assets," filed Jun. 7, 2017. Applicant claims priority to and the benefit of each of such applications and incorporate all such applications herein by reference in its entirety.

FIELD

The present disclosure relates generally to antenna systems and, more particularly, antenna systems for communicating with networks from altitude changing objects.

BACKGROUND

Cellular networks have been designed and implemented with the intent of servicing terrestrial based customers. Cellular communication towers ("nodes") are located and spaced to provide the necessary coverage taking into account terrain characteristics such as blockage due to hills and other obstructions. In urban centers, where high rise buildings are prevalent, nodes can be located to provide the coverage for cellular customers located in the upper floors. Distributed Antenna Systems (DAS) infrastructure is also installed in many high-rise buildings to re-distribute cellular signals for use indoors. Prior to installing a cellular network, electromagnetic (EM) simulations can be performed to determine cellular antenna system characteristics and to verify proper cell signal coverage in the intended region. The recent increase of drone usage and other systems capable of variable altitudes provide a new challenge for cellular network operators with regard to interference mitigation between the drone and/or other systems with variable altitude and terrestrial users as well as drones and adjacent nodes.

SUMMARY

Aspects and advantages of embodiments of the present disclosure will be set forth in part in the following description, or may be learned from the description, or may be learned through practice of the embodiments.

One example aspect of the present disclosure is directed to a communication system for an altitude changing object. The communication system can include an antenna system having one or more antennas. The one or more antennas can be associated with a single fixed radiation pattern. The communication system can include one or more processors configured to execute a control routine to perform operations. The operations can include obtaining data indicative of one or more communication parameters associated with the altitude changing object. The operations can include determining a transmit power for each of the one or more antennas based at least in part on the one or more communication parameters. The operations can include controlling the antenna system based at least in part on the transmit power to communicate with a node in the communication network.

Other example aspects of the present disclosure are directed to systems, methods, devices, and processes associated with antenna systems for altitude changing objects.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 6 depicts example parameters used as part of a control scheme for controlling communication between an altitude changing object and a network according to example embodiments of the present disclosure;

DETAILED DESCRIPTION

Figure 1:
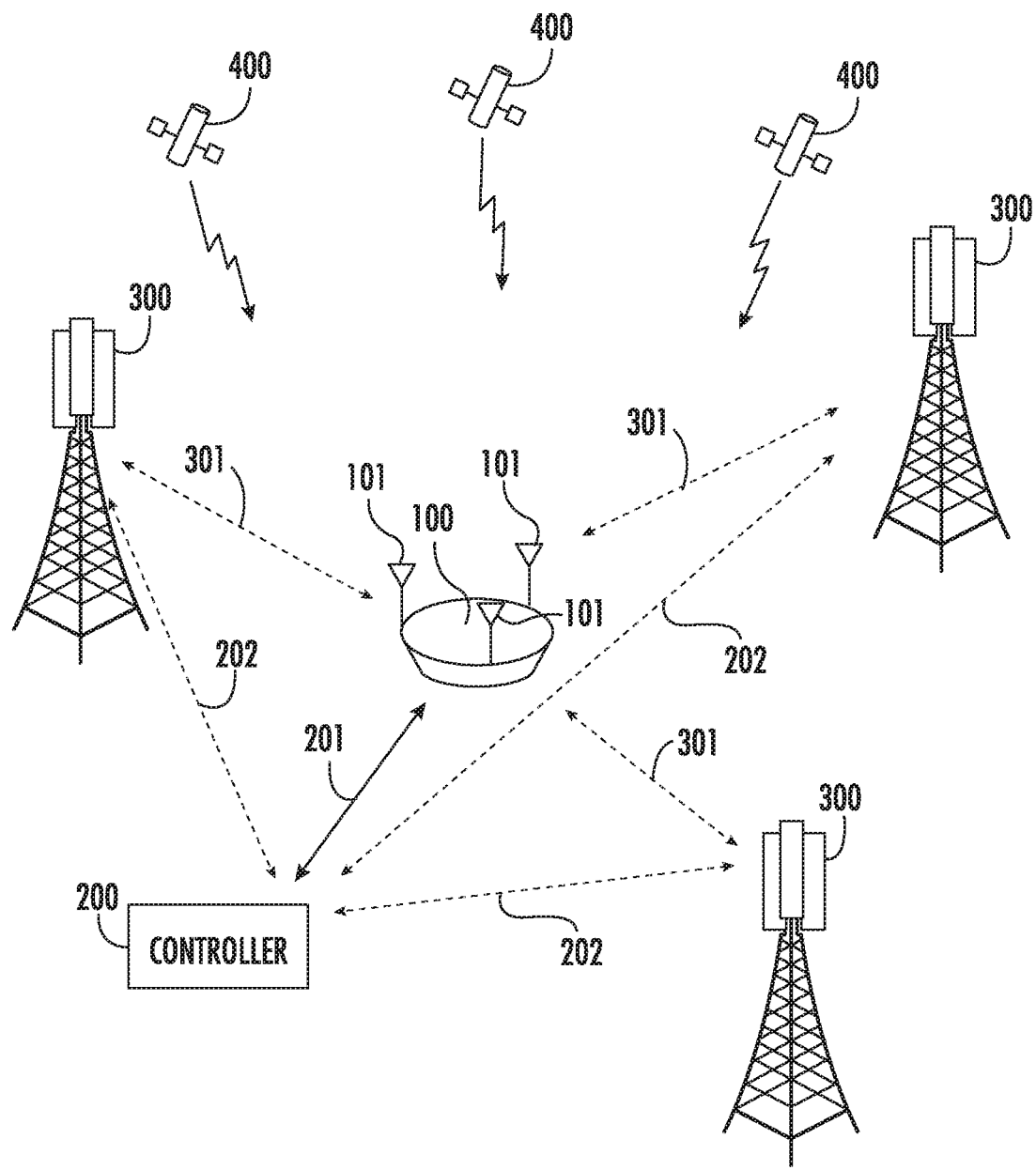
FIG. 1 depicts an example altitude changing object in a network according to example embodiments of the present disclosure.

Reference now will be made in detail to embodiments, one or more examples of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

In example aspects, systems and methods for communication link configuration over cellular communication systems or other networks can be achieved via (i) transmit power control, (ii) antenna system configuration, and/or (iii) a combination thereof, where airborne and/or altitude variable radio are deployed. Methods of transmit power control and/or antenna system configuration (e.g., optimization or near optimization) can be implemented where parameters including altitude of radio, location in network of radio, and node or base station configuration of network are used, for instance, to reduce interference between radio and adjacent nodes as a function of altitude and dynamic motion of said radio, while maintaining communication link performance with the intended node. As used herein, a radio refers to a communication system capable of communicating wirelessly using, for instance, RF signals. A radio can include an antenna system and supporting circuitry (e.g., receiver, transmitter, transceiver, processors, memory devices, etc.).

For purposes herein, the term "altitude changing object" is used to describe an altitude changing object configured for wireless communication with a network, such as drones. Aspects of the present disclosure are discussed with reference to drones for purposes of illustration and discussion. The drone(s) can be capable of communicating with a cellular network or other network using one or more radios. Those of ordinary skill in the art, using the disclosures provided herein, will understand that aspects of the present disclosure can be discussed with other altitude changing objects capable of communicating wirelessly with a network and capable of altitude variation, such as elevators, altitude changing vehicles, etc.

The term "ground level" means an arbitrary elevation which includes sea level, average height of buildings above ground within a region, maximum height above ground with respect to buildings and/or stationary objects within a region, or any representation of elevation therebetween but not exceeding the tallest hill, building or other stationary object in the region.

Certain cellular networks have been designed to provide continuous coverage in the azimuth plane, translating to good coverage around the node or cell tower. In the elevation plane, a reduced beamwidth can be specified from the antenna since terrestrial based customers are assumed. This reduction in beamwidth in the elevation plane can allow for higher antenna system gain in the azimuth plane which will normally translate to improved cellular system performance. However, when altitude changing object usage is introduced on the cellular network elevation plane, performance of nodes or cell towers needs to be considered and optimized if overall system performance is to be maintained.

The concern of altitude changing object use in networks primarily relates to interference effects related to improved field of view of the altitude changing object as operating altitude increases. At higher altitude the altitude changing object will not only connect better to the intended node but can also be in the field of view of more nodes. The altitude changing object at higher altitudes can potentially be capable of interfering with a larger number of network users (terrestrial customers) when compared to a terrestrial based radio.

Example aspects of the present disclosure are directed to a method to control transmit power on the cellular radio on the altitude changing object as a function of one or more variables, such as altitude, location within cell, and object orientation. In some embodiments, a radio with antenna system on the altitude changing object can be controlled to provide dynamic modification of the radiation pattern or mode associated with the antenna system as a function of the one or more variables. One or more of these techniques can be used to improve link quality for the intended connection and/or can reduce interference to adjacent nodes and other cellular system customers.

In some embodiments, a radio with an antenna system can be integrated into an altitude changing object (e.g., drone) for use on a terrestrial cellular network. The antenna system can include one or more antennas associated with a single fixed radiation pattern. A method of determining altitude of the drone can be implemented (e.g., with altitude referenced to local ground level). An algorithm, look-up table, or control routine can be executed (e.g., by one or more control devices, processors, etc.) to determine a transmit power level for the antenna system as a function of altitude and/or other parameters.

In some embodiments, a radio with an antenna system can be integrated in an altitude changing object for use terrestrial cellular network. The altitude changing object can include a positioning system (e.g., a GPS receiver) for determining a position (latitude, longitude, altitude) of the altitude changing object. The altitude changing object can include a gyroscope or other system for use in determining orientation of the object. The antenna system can be associated with a single fixed radiation pattern. A method of determining altitude of the object can be implemented (e.g., with altitude referenced to local ground level). A position and/or orientation of the altitude changing object in the cellular network can be determined (e.g., using GPS and/or gyroscope). Information associated with cellular nodes in the vicinity of the altitude changing object can be obtained (e.g., received via the radio on the altitude changing object).

An algorithm, look-up table, or control routine can be executed (e.g., by one or more processors, control device(s), etc.) to determine a transmit power level for the antenna system as a function of altitude for use in communicating with the intended node and/or to reduce interference with adjacent nodes in the field of view of the altitude changing object. Information used in this process to determine transmit power level can include one or more of the altitude of the altitude changing object, orientation of the altitude changing object, and location of the altitude changing object in the cellular network.

In some embodiments, the altitude changing object can include a radio with an antenna system having a modal antenna. Examples of modal antenna systems are described in commonly owned Pub. No. US2016/0099501; and U.S. Pat. Nos. 9,240,634; 8,648,755, 8,362,962; and 7,911,402; the contents of each of which are hereby incorporated by reference. In addition, example modal antennas are discussed with reference to FIG. 9.

The modal antenna system can be capable of generating multiple radiation patterns and/or polarization states. An algorithm or control routine can be executed to determine a radiation pattern and/or polarization state from the modal antenna system based on metrics available such as object altitude, object orientation and/or direction of travel, location of object in the network and/or locations of the additional nodes within the field of view of the antenna system. In some embodiments, transmit power level for the antenna system can be adjusted in synchronization with radiation pattern and/or polarization state selection.

In some embodiments, information received from the network can be used to inform the radio on the altitude changing object that one or multiple nodes in the field of view have users that are being interfered with from the radio. An algorithm or control routine can be executed to select a radiation pattern for the modal antenna that provides good connectivity to the node but under-illuminates the area served by the node. An example of this technique can be the use of a modal or beam steering antenna system to generate a beam that illuminates the node or cell tower with the peak of the beam positioned above the antenna system on the node or cell tower. The ground region in the node or cell will be under-illuminated compared to the case where the beam steering antenna system on the altitude changing object generates a peak gain positioned at the antenna system on the node or cell tower. Transmit power level for the drone radio modem can be adjusted in synchronization with antenna system radiation pattern and/or polarization state selection.

In these embodiments, transmit power emitted from the antenna system associated with a radio on an altitude changing object can be based on metrics obtained from the network system, such as but not limited to: object altitude, object orientation and/or direction of travel, location of object in the network and/or locations of the additional nodes within the field of view of the object.

With reference now to the FIGS., example embodiments will be described in detail. FIG. 1 illustrates an example of a drone 100 in a network, such as a cellular network. The drone 100 can be coupled to a controller 200 via controller-to-drone communication link 201. Controller 200 can be adapted to communicate control signals to drone 100 for controlling movement thereof, including movement in vertical and horizontal planes relative to the altitude changing object, as well as orientation (rotation, tilt, etc.). In some embodiments, the controller 200 can be included as part of the drone 100.

The controller 200 can include one or more control devices. The one or more control devices can include, for instance, one or more processors and one or more memory devices. The one or more processors can be microprocessors, application specific integrated circuits, microcontrollers, or other device(s) capable of performing operations. The memory devices can include any type of computer-readable media, including, but not limited to, non-transitory computer-readable media, RAM, ROM, flash memory, optical memory, magnetic media, or other memory devices. The one or more memory devices can store computer readable instructions that when executed by the one or more processors cause the one or more processors to perform operations, such as implementation of any algorithm, method, process, and/or control routine described herein.

Drone 100 can include one or more antennas 101 forming an antenna system. In some embodiments, the antenna(s) can be associated with a single radiation pattern. In some embodiments, the antenna system may include one or more modal antennas (otherwise termed "beam steering antenna system" herein). The modal antennas can be reconfigurable in any one of a plurality of possible modes. The modal antenna(s) can be associated with a distinct radiation pattern or polarization in each of the plurality of modes. An example modal antenna is described with reference to FIGS. 9, 10, and 11.

A network (e.g., cellular network) is illustrated with nodes 300 (e.g., three cellular base station terminals shown). Any number of nodes 300 may be implemented to form a network. Positioning satellites 400 (e.g., GPS satellites) can be used to determine a location of the drone 100. GPS is one technique for determining a location of the altitude changing object; however, other similar position sensing techniques may be implemented, such as triangulating position based on signal analysis over the cellular network, dead reckoning, etc.

Several communication links are established with the drone 100 in the network, such as controller-to-drone communication link 201, controller-to-network-node communication links 202, drone-to-network-node communication links 301, drone-to-GPS communication links, and communication links from drone 100 to other devices (e.g., client devices) on the network (not shown). For example, cellular, Wi-Fi, peer-to-peer link or other communication links may connect the controller 200 to the drone 100.

Interference can be caused at cellular bands between drone 100 and adjacent nodes 300 of the network, or drone 100 and other client devices of the network. GPS or other positioning systems can be implemented to provide information related to drone location within the network. According to example embodiments of the present disclosure, with location (including altitude), direction of travel, and/or other information, transmit power can be regulated at the drone 100 to mitigate interference. In some embodiments, a mode of a multimode antenna of the drone radio can be changed to create one or more radiation pattern nulls or to steer nulls in desired directions to mitigate interference caused by drone operation.

Figure 2:
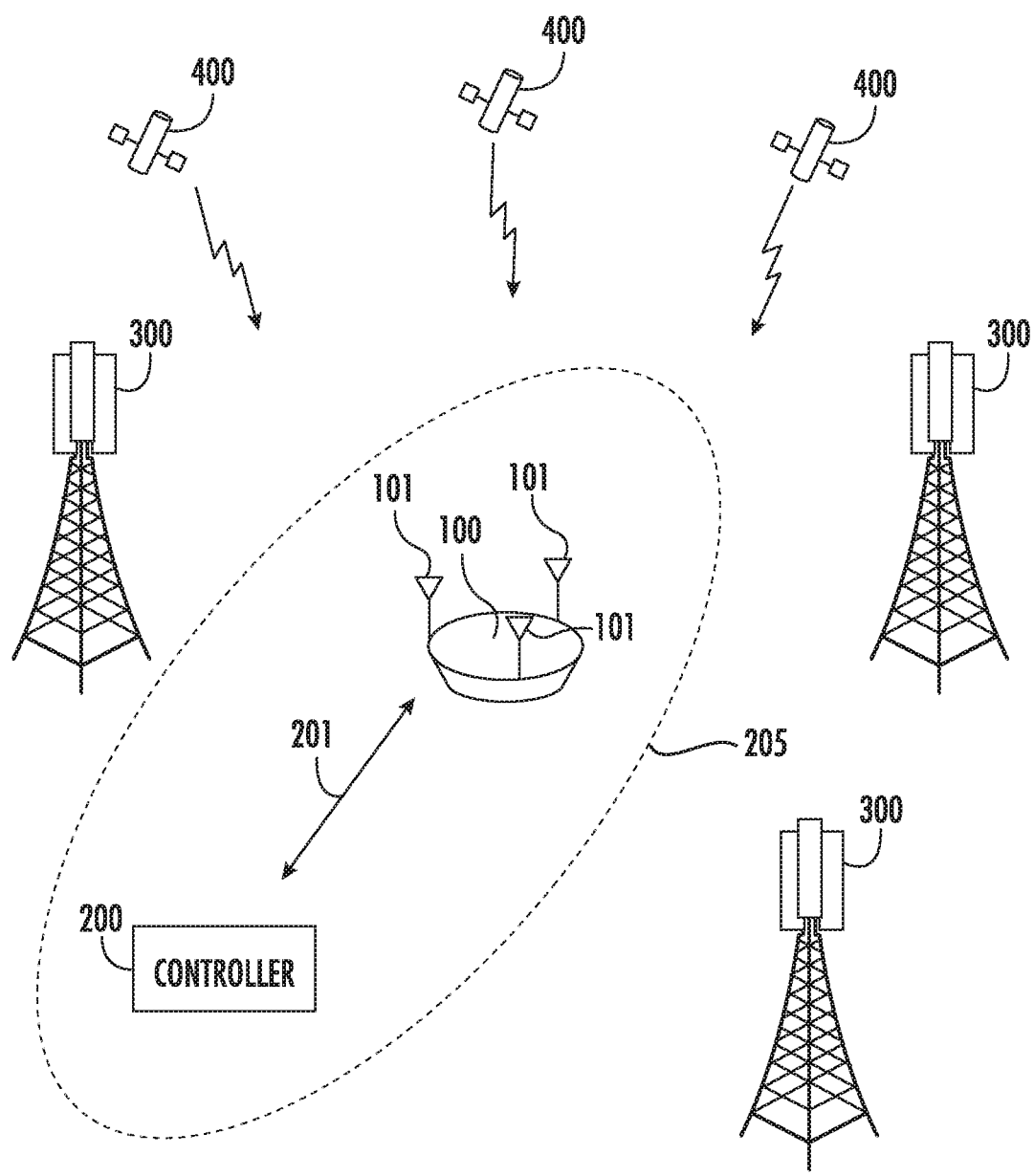
FIG. 2 depicts an example altitude changing object in a network according to example embodiments of the present disclosure.

FIG. 2 illustrates a drone 100 and controller 200 in a cellular network and describes how location of drone in the network can be used to optimize or enhance antenna system performance for the antenna on the drone. FIG. 2 shows various parameters may be surveyed to configure the drone/node link. Based on location of the drone 100 in the network, an antenna system configuration for the radio system can be selected for configuration in azimuth and elevation planes. In some embodiments, velocity of the drone 100 can be considered. In some embodiments, orientation or direction of travel can be considered. A gyroscope or accelerometer may be implemented on the drone for orientation information.

Here, the drone 100 with one or more antennas 101 is linked to controller 200 via controller-to-drone communication link 201. The communication link 201 between drone 100 and controller 200 is isolated from the network as shown by broken line circle 205. GPS satellites 400 are provided to triangulate location of the drone 100 on the network made up of nodes 300.

Figure 3:
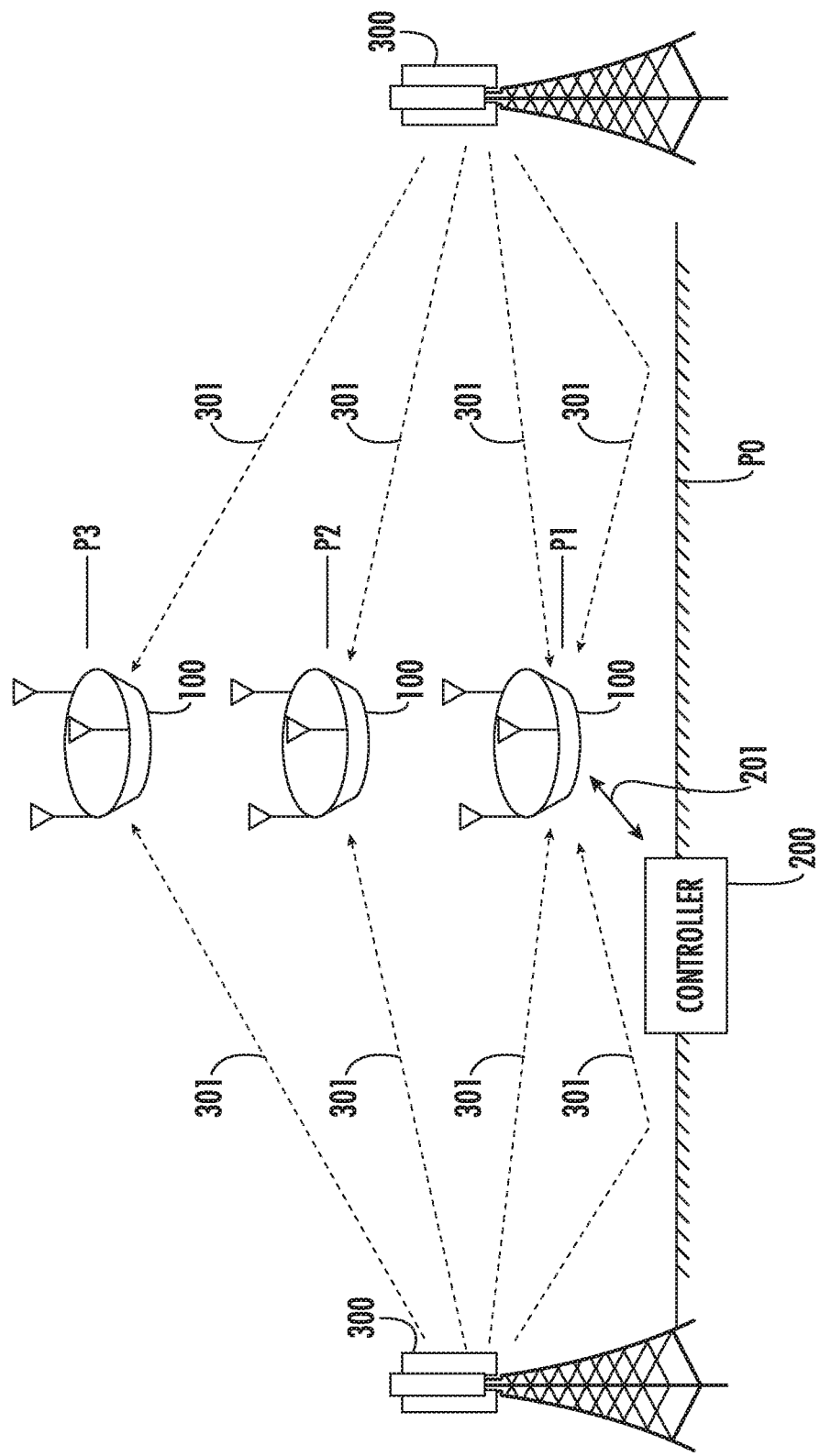
FIG. 3 depicts an example altitude changing object at multiple altitudes in a network according to example embodiments of the present disclosure.

FIG. 3 illustrates a drone 100 at multiple altitudes in a cellular network and how the signals will vary as the altitude changes. More particularly, FIG. 3 shows the drone 100 as it progresses about three vertical positions (P1; P2; and P3, respectively) above ground level P0. Controller 200 is in communication with drone 100 via controller-to-drone communication link 201, and thereby controls the ascent of drone over the three vertical positions, each with a different altitude relative to ground level.

Communication link quality can vary as a function of altitude. According to example embodiments of the present disclosure, controller 200 can control antenna system on drone 100 to configure the antenna system to improve link based on altitude, orientation, direction of travel, and/or other parameters. Altitude, orientation, and direction of travel associated with the drone 100 can be determined, for instance, using GPS, gyroscope, accelerometer, information from the cellular network, and/or a combination thereof. Information on nodes in the cellular network is provided to drone controller via an access grant from the cellular network. The antenna system on the drone can be dynamically configured based on location metrics to improve and/or maintain link with the intended node along with reducing interference with other nodes or client devices. Example methods that can be implemented to control the antenna systems on drone 100 are discussed with reference to FIGS. 7 and 8.

Figure 4:
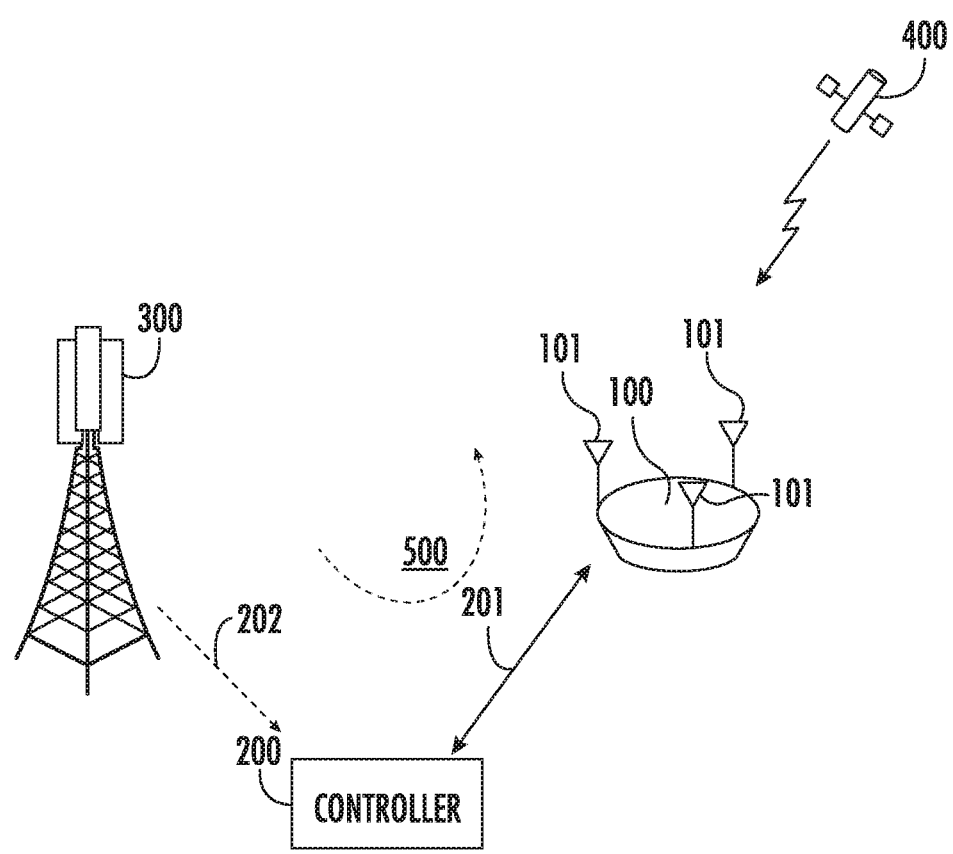
FIG. 4 depicts example data flow in a communication system according to example embodiments of the present disclosure.

FIG. 4 shows a schematic representing data flow 500 for use in the antenna system adjustment and transmit-power selection for a drone radio according to example embodiments of the present disclosure. An algorithm or control routine executed by one or more processors associated with the drone radio (or other processors) uses information to select a radiation mode of a multimode antenna and/or adjust transmit power of an antenna. For example, in some embodiments, location of nodes 300 in the network can be communicated to the drone controller 200 in a first signal over controller-to-network-node communication links 202; location of nodes in network information can transferred from controller to drone 100 in a second signal over controller-to-drone communication link 201, for example stored in a lookup table or database; GPS system and satellites 400 can determine location of drone on the network; altitude, orientation, velocity, and/or location can be determined by drone based systems such as GPS, accelerometer, gyroscope, among others; and data is collected for use in an algorithm or control routine executed by one or more processors to determine a antenna system radiation mode and/or transmit power for antenna system of the drone radio.

Figure 5:
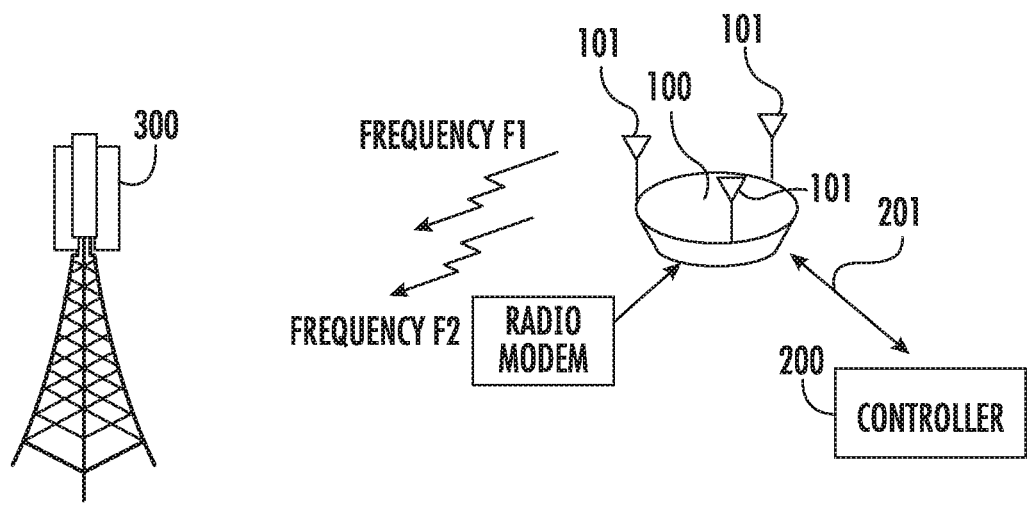
FIG. 5 depicts frequency selection in a communication system according to example embodiments of the present disclosure.

FIG. 5 illustrates the process of selecting a frequency band for communication between a drone and a node or cell tower according to example embodiments of the present disclosure. In this example embodiment, multi-band radio modem allows for selection of frequency band to operate on to enhance a communication link. The frequency band can be selected based on various parameters, such as altitude of the drone, orientation of the drone, location of the drone in the network, velocity of the drone, the location of other nodes in the network (e.g., within the field of view of antenna system of the drone), and/or other parameters. In some embodiments, the controller 200 can send a control link signal over controller-to-drone communication link 201 with instructions to drone antenna system 101 of drone 100. The location of nodes in the network information is transferred to the drone. Drone antenna system 101 can implement signals with frequency F1 and/or frequency F2 toward the intended node 300.

FIG. 6 illustrates the parameters used in a system control matrix to select a mode of operation and/or transmit power for an antenna system according to example embodiments of the present disclosure. As shown, the parameters can include one or more of SINR of the intended link; SINR of interferer(s); altitude; orientation; antenna beam state; and/or frequency band.

Figure 7:
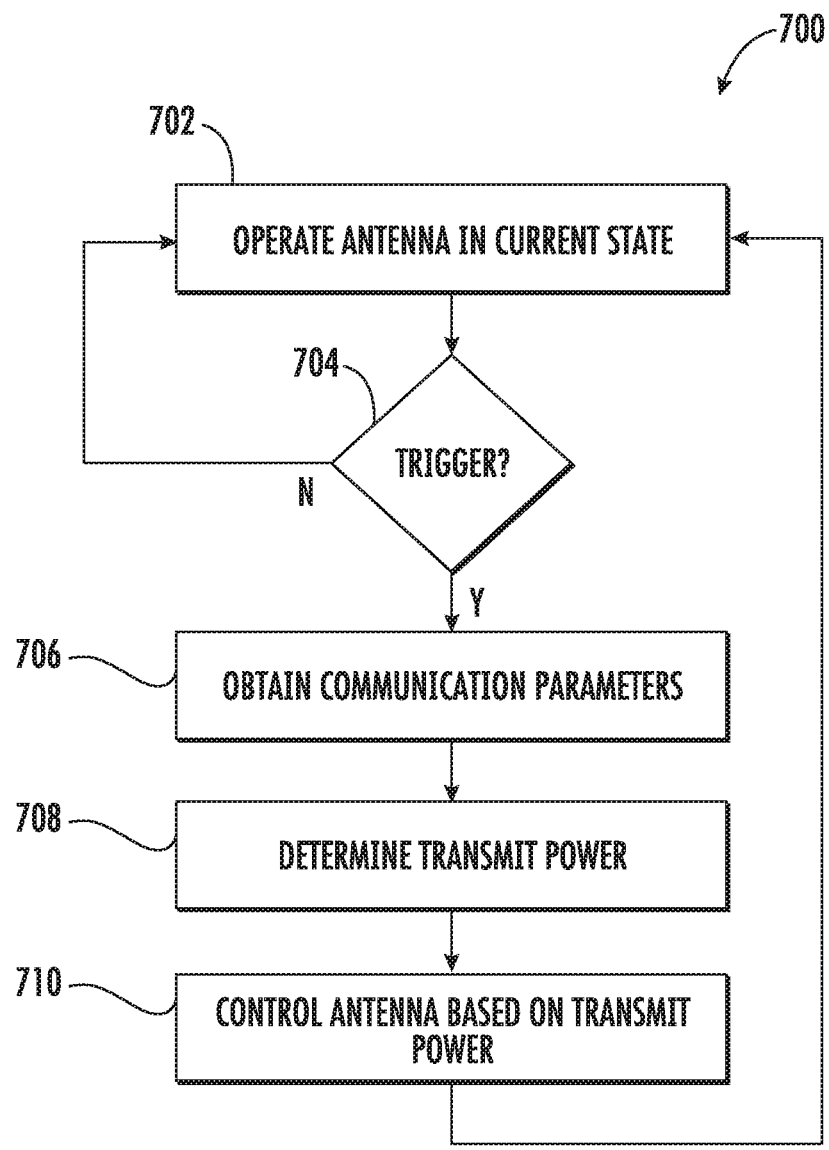
FIG. 7 depicts a flow diagram of an example method according to example embodiments of the present disclosure.

FIG. 7 depicts a flow diagram of an example method (700) for configuring an antenna system on an altitude changing object (e.g., a drone) according to example embodiments of the present disclosure. The method can be implemented as part of a control routine/algorithm executed by one or more processors (e.g., one or more processors associated with the altitude changing object). FIG. 7 depicts steps performed in a particular order for purposes of illustration and discussion. Those of ordinary skill in the art, using the disclosures provided herein, will understand that various steps of any of the methods described herein can be adapted, expanded, performed simultaneously, omitted, rearranged and/or modified in various ways without deviating from the scope of the present disclosure.

At (702), the method can include operating an antenna system of an altitude changing object in a current state. For instance, the antenna system can be controlled to transmit based on a transmit power for one or more antennas in the antenna system in its current state.

At (704), the method can include detecting a trigger condition. The trigger condition can trigger the occurrence of the remainder of method (700), namely controlling the antenna system based on various communication parameters associated with the altitude changing object (e.g., altitude) to enhance a communication link in a network, such as a cellular network. The trigger condition can be any defined condition that triggers the occurrence of (706), (708), and/or (710) depicted in FIG. 7. For example, in some embodiments, the trigger condition can be the expiration of a period of time. In some embodiments, the trigger condition can include detecting a change in an operating condition of the altitude changing object (e.g., change in altitude, change in location in a network, etc.). In some embodiments, the trigger condition can occur prior to a radio associated with the altitude changing object transmitting and/or receiving information to and/or from one or more nodes in a network. Other suitable trigger conditions can be implemented without deviating from the scope of the present disclosure.

At (706), the method includes obtaining data indicative of communication parameters associated with the altitude changing object. As discussed above, the data indicative of communication parameters can include, for instance, an altitude of the altitude changing object. The altitude can be determined, for instance, from a positioning system (e.g., GPS system), from a controller controlling the altitude changing object, from an altimeter on the altitude changing object, or other suitable source.

In some embodiments, the data indicative of communication parameters can include, for instance, orientation of the altitude changing object, direction of travel of the altitude changing object, and/or velocity of travel of the altitude changing object. These parameters can be obtained, for instance, from a positioning system (e.g., GPS system), from a controller controlling the altitude changing object, from one or more sensors on the altitude changing object (e.g., gyroscope), or other suitable source.

In some embodiments the data indicative of communication parameters can include, for instance, the location of the altitude changing object in a communication network (e.g., location relative to one or more nodes). This communication parameter can be obtained, for instance, from a positioning system (e.g., GPS system), from a controller controlling the altitude changing object, from the one or more nodes, or from another suitable source.

In some embodiments, the data indicative of communication parameters can include channel quality indicators (CQI) such as signal to interference plus noise ratio (SINR). For instance, the communication parameters can include SINR associated with an intended communication link and/or SINR associated with one or more potential interferers. Other CQI(s) can be used without deviating from the scope of the present disclosure, such as signal to noise ratio (SNR); receive signal strength indicator (RSSI), bit error rate (BER), and other metrics. The CQI(s) can be obtained from any suitable source, such as from a baseband processor, from one or more nodes in network, from the controller controlling the altitude changing object, etc.

At (708) the method can include determining a transmit power for one or more antennas in the antenna system based on the data indicative of the communication parameters. In some embodiments, a control routine, algorithm, and/or lookup table can be executed to determine a transmit power as function of one or more of the communication parameters. For instance, in some embodiments, a look up table correlating altitude or other communication parameter with a transmit power for one or more antennas can be accessed from a memory device. The transmit power corresponding with a particular altitude or other communication parameter can be determined based on the data indicative of current altitude or other communication parameter.

In some embodiments, a control routine or algorithm can implement a scoring function or cost function based at least in part on the one or more communication parameters. A score or cost can be determined as a function of one or more of the communication parameters (e.g., altitude, orientation, position, SINR, etc.). A transmit power can be determined to increase a score provided by the scoring function or reduce a cost provided by the cost function.

In some embodiments, an iterative control routine or algorithm can be implemented. For instance, the antenna system can be cycled through a plurality of transmit powers when the altitude changing object changes altitude (or other communication parameter) by a certain threshold. The transmit power that improves a communication link (e.g., as determined based on one or more CQIs) can be selected as the transmit power for operating one or more antennas in the antenna system.

At (710), the method includes controlling the antenna system based on the determined transmit power. For instance, the method can include controlling the antenna system to adjust a transmit power of at least one antenna having a single fixed radiation pattern to correspond with or be near to the determined transmit power.

Figure 8:
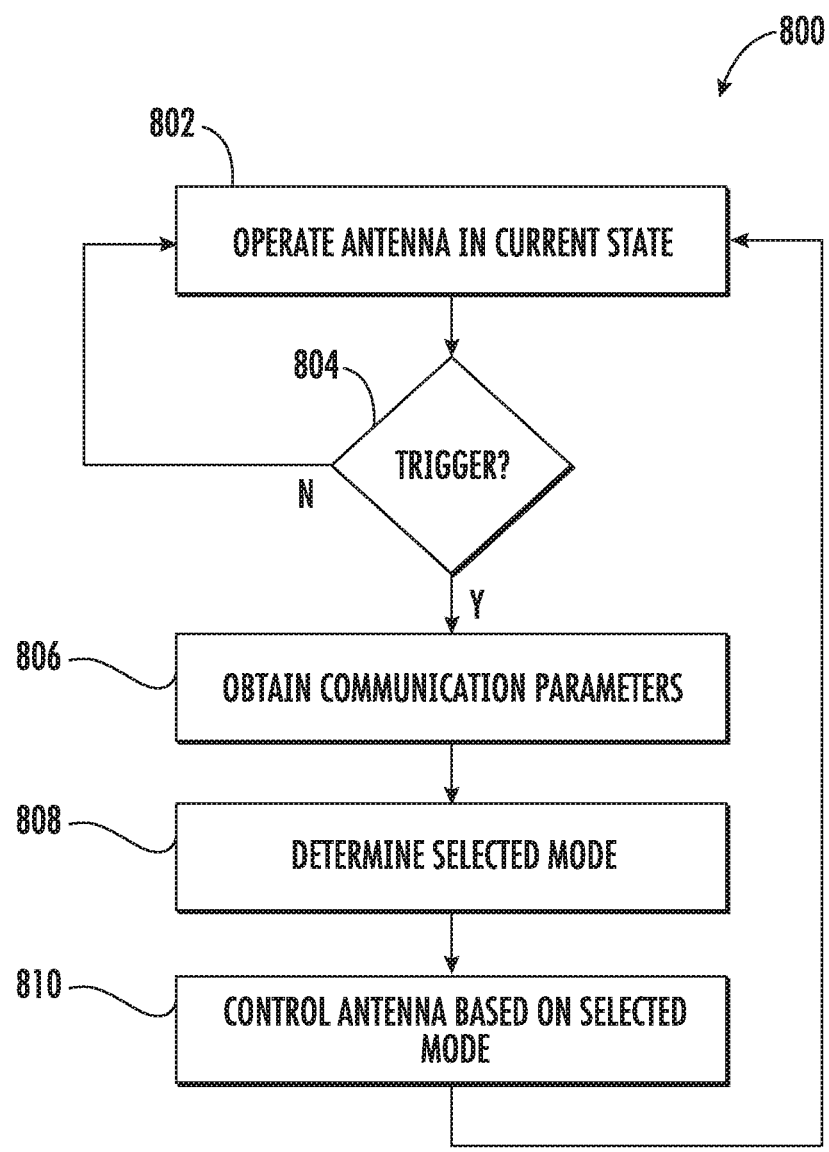
FIG. 8 depicts a flow diagram of an example method according to example embodiments of the present disclosure.

FIG. 8 depicts a flow diagram of an example method (800) for configuring an antenna system on an altitude changing object (e.g., a drone) according to example embodiments of the present disclosure. The method can be implemented as part of a control routine/algorithm executed by one or more processors (e.g., one or more processors associated with the altitude changing object). FIG. 8 depicts steps performed in a particular order for purposes of illustration and discussion. Those of ordinary skill in the art, using the disclosures provided herein, will understand that various steps of any of the methods described herein can be adapted, expanded, performed simultaneously, omitted, rearranged and/or modified in various ways without deviating from the scope of the present disclosure.

At (802), the method can include operating an antenna system of an altitude changing object in a current state. For instance, a modal antenna in the antenna system can be operated in a selected mode of a plurality of modes associated with the modal antenna. Each mode can be associated with a distinct radiation pattern.

At (804), the method can include detecting a trigger condition. The trigger condition can trigger the occurrence of the remainder of method (800), namely controlling the antenna system based on various communication parameters associated with the altitude changing object (e.g., altitude) to enhance a communication link in a network, such as a cellular network. The trigger condition can be any defined condition that triggers the occurrence of (806), (808), and (810) depicted in FIG. 8. For example, in some embodiments, the trigger condition can be the expiration of a period of time. In some embodiments, the trigger condition can include detecting a change in an operating condition of the altitude changing object (e.g., change in altitude, change in location in a network, etc.). In some embodiments, the trigger condition can occur prior to a radio associated with the altitude changing object transmitting and/or receiving information to and/or from one or more nodes in a network. Other suitable trigger conditions can be implemented without deviating from the scope of the present disclosure.

At (806), the method includes obtaining data indicative of communication parameters associated with the altitude changing object. As discussed above, the data indicative of communication parameters can include, for instance, an altitude of the altitude changing object. The altitude can be determined, for instance, from a positioning system (e.g., GPS system), from a controller controlling the altitude changing object, from an altimeter on the altitude changing object, or other suitable source.

In some embodiments, the data indicative of communication parameters can include, for instance, orientation of the altitude changing object, direction of travel of the altitude changing object, and/or velocity of travel of the altitude changing object. These parameters can be obtained, for instance, from a positioning system (e.g., GPS system), from a controller controlling the altitude changing object, from one or more sensors on the altitude changing object (e.g., gyroscope), or other suitable source.

In some embodiments the data indicative of communication parameters can include, for instance, the location of the altitude changing object in a communication network (e.g., location relative to one or more nodes). This communication parameter can be obtained, for instance, from a positioning system (e.g., GPS system), from a controller controlling the altitude changing object, from the one or more nodes, or from another suitable source.

In some embodiments, the data indicative of communication parameters can include CQIs such as SINR. For instance, the communication parameters can include SINR associated with an intended communication link and/or SINR associated with one or more potential interferers. Other CQI(s) can be used without deviating from the scope of the present disclosure, such as SNR; receive signal strength indicator RSSI, bit error rate BER, and other metrics. The CQI(s) can be obtained from any suitable source, such as from a baseband processor, from one or more nodes in network, from the controller controlling the altitude changing object, etc.

At (808) the method can include determining a selected mode of a plurality of modes for one or more modal antennas in the antenna system based on the data indicative of the communication parameters. In some embodiments, a control routine, algorithm, lookup table can be executed to determine a selected mode as function of one or more of the communication parameters. For instance, in some embodiments, a look up table correlating altitude or other communication parameter with a selected mode for one or more modal antennas can be accessed from a memory device. The selected mode corresponding with a particular altitude or other communication parameter can be determined based on the data indicative of current altitude or other communication parameter.

In some embodiments, a control routine or algorithm can implement a scoring function or cost function based at least in part on the one or more communication parameters. A score or cost can be determined as a function of one or more of the communication parameters (e.g., altitude, orientation, position, SINR, etc.). A selected mode can be determined to increase a score provided by the scoring function or reduce a cost provided by the cost function.

In some embodiments, an iterative control routine or algorithm can be implemented. For instance, the antenna system can be cycled through a plurality of transmit powers when the altitude changing object changes altitude (or other communication parameter) by a certain threshold. The transmit power that improves a communication link (e.g., as determined based on one or more CQIs) can be selected as the transmit power for operating one or more antennas in the antenna system.

At (810), the method includes controlling the antenna system based on the selected mode. For instance, the method can include controlling one or more modal antennas to adjust the mode to correspond with or be near to the determined selected mode. Example techniques for controlling an example modal antenna will be discussed with reference to FIGS. 9-11.

Figure 9:
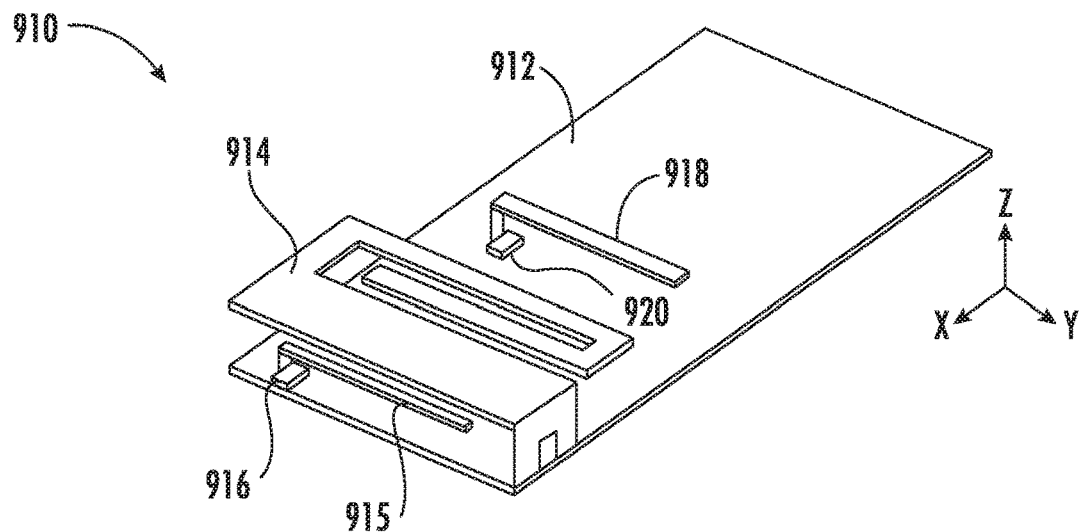
FIGS. 9, 10, and 11 depict aspects of an example modal antenna according to example embodiments of the present disclosure.

FIG. 9 illustrates an example embodiment of a modal antenna 910 that can be used in accordance with aspects of the present disclosure. The modal antenna 910 may include a circuit board 912 (e.g., including a ground plane) and a driven antenna element 914 disposed on the circuit board 912. An antenna volume may be defined between the circuit board (e.g., and the ground plane) and the driven antenna element.

In some embodiments, a first parasitic element 915 may be positioned at least partially within the antenna volume. A first active tuning element 916 may be coupled with the parasitic element 915. The first active tuning element 916 can be a passive or active component or series of components and may be configured to alter a reactance on the first parasitic element 914 either by way of a variable reactance, or shorting to ground, resulting in a frequency shift of the antenna.

In some embodiments, a second parasitic element 918 may be disposed proximate the circuit board 912 and may be positioned outside of the antenna volume. The second parasitic element 918 may further include a second active tuning element 920 which may individually include one or more active and/or passive components. The second active tuning element 920 can be a passive or active component or series of components and may be configured to alter a reactance on the second parasitic element 918 either by way of a variable reactance, or shorting to ground, resulting in a frequency shift of the antenna. The second parasitic element 918 may be positioned adjacent the driven element 914 and may also be positioned outside of the antenna volume.

The described configuration may provide an ability to shift the radiation pattern characteristics of the driven antenna element by varying a reactance thereon. Shifting the antenna radiation pattern can be referred to as "beam steering". In instances where the antenna radiation pattern comprises a null, a similar operation can be referred to as "null steering" since the null can be shifted to an alternative position about the antenna (e.g., to reduce interference). In some embodiments, the second active tuning element 920 may include a switch for connecting the second parasitic to ground when "On" and for terminating the short when "Off". It should however be noted that a variable reactance on either of the first or second parasitic elements, for example by using a variable capacitor or other tunable component, may further provide a variable shifting of the antenna pattern or the frequency response. For example, the first active tuning element 916 and/or second active tuning element 920 may include at least one of a tunable capacitor, MEMS device, tunable inductor, switch, a tunable phase shifter, a field-effect transistor, or a diode.

Figure 10:
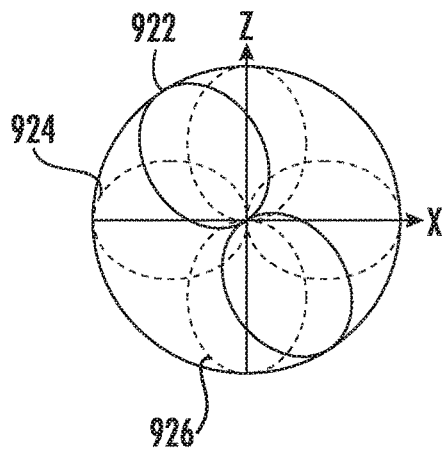

FIG. 10 illustrates a two-dimensional antenna radiation pattern associated with the modal antenna of FIG. 9. The radiation pattern may be shifted by controlling an electrical characteristic associated with at least one of the first and/or second parasitic elements 915, 918 of the modal antenna 910. For example, in some embodiments, the radiation pattern may be shifted from a first mode 922 to a second mode 924, or a third mode 926.

Figure 11:
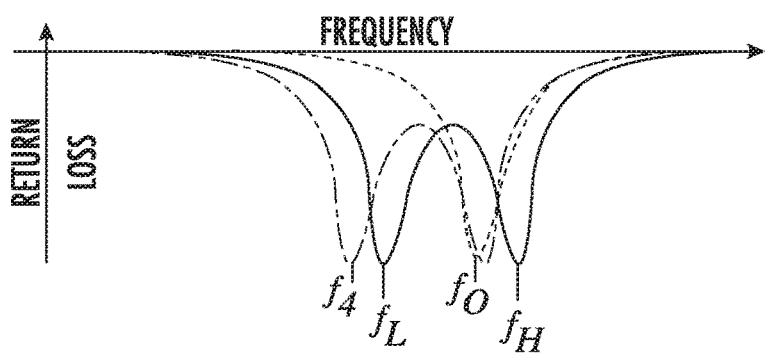

FIG. 11 illustrates an example frequency plot of the modal antenna of FIG. 9 according to example aspects of the present disclosure. The frequency of the antenna can be shifted by controlling an electrical characteristic associated with at least one of the first and/or second parasitic elements 915, 918 of the modal antenna 910. For example, a first frequency ($f_0$) of the antenna may be achieved when the first and second parasitic elements are switched "Off"; the frequencies ($f_L$) and ($f_H$) may be produced when the second parasitic is shorted to ground; and the frequencies ($f_4$; $f_0$) may be produced when the first and second parasitic elements are each shorted to ground. It should be understood that other configurations are possible within the scope of this disclosure. For example, more or fewer parasitic elements may be employed. The positioning of the parasitic elements may be altered to achieve additional modes that may exhibit different frequencies and/or combinations of frequencies.

FIGS. 9-11 depict one example modal antenna having a plurality of modes for purposes of illustration and discussion. Those of ordinary skill in the art, using the disclosures provided herein, will understand that other modal antennas and/or antenna configurations can be used without deviating from the scope of the present disclosure. As used herein a "modal antenna" refers to an antenna capable of operating in a plurality of modes where each mode is associated with a distinct radiation pattern.

While the present subject matter has been described in detail with respect to specific example embodiments thereof, it will be appreciated that those skilled in the art, upon attaining an understanding of the foregoing may readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A communication system for an altitude changing object, the communication system comprising:
    an antenna system having one or more antennas, each of the one or more antennas associated with a single fixed radiation pattern; and
    one or more processors, the one or more processors configured to execute a control routine to perform operations, the operations comprising:
        detecting a trigger condition prior to the altitude changing object communicating with one or more nodes in a communication network, the trigger condition comprising a change in an operating condition of the altitude changing object;
        responsive to detecting the trigger condition, obtaining data indicative of one or more communication parameters associated with the altitude changing object, the one or more communication parameters comprising an altitude of the altitude changing object;
        determining a transmit power for each of the one or more antennas based at least in part on the altitude of the altitude changing object; and
        controlling the antenna system based at least in part on the transmit power to communicate with the one or more nodes in the communication network.

2. The communication system of claim 1, wherein the one or more communication parameters comprises an orientation of the altitude changing object or a direction of travel of the altitude changing object.

3. The communication system of claim 2, wherein the orientation of the altitude changing object or the direction of travel of the altitude changing object is obtained based at least in part on a gyroscope.

4. The communication system of claim 1, wherein the one or more communication parameters comprise a location of the altitude changing object in the communication network.

5. The communication system of claim 1, wherein the one or more communication parameters comprise a location of one or more nodes in the communication network.

6. The communication system of claim 1, wherein the transmit power is determined to reduce interference with one or more client devices configured to communicate with the altitude changing object.

7. The communication system of claim 1, wherein the one or more processors are configured to reduce the transmit power when the altitude of the altitude changing object increases.

8. The communication system of claim 1, wherein the operations further comprise determining a frequency band for communicating with the node in the communication network.

9. The communication system of claim 1, wherein the communication network is a cellular network.

10. A communication system for an altitude changing object, the communication system comprising:
   an antenna system having one or more antennas, each of the one or more antennas associated with a single fixed radiation pattern; and
   one or more processors configured to execute a control routine to perform operations, the operations comprising:
      detecting a change in altitude of the altitude changing object prior to the altitude changing object communicating with one or more nodes in a communication network;
      responsive to detecting the change in altitude of the altitude changing object, obtaining data indicative of one or more communication parameters associated with the altitude changing object, the one or more parameters comprising an altitude of the altitude changing object;
      determining a transmit power for each of the one or more antennas based at least in part on the altitude of the altitude changing object; and
      controlling the antenna system based at least in part on the transmit power to communicate with the one or more nodes in the communication network.

* * * * *